UNITED STATES PATENT OFFICE.

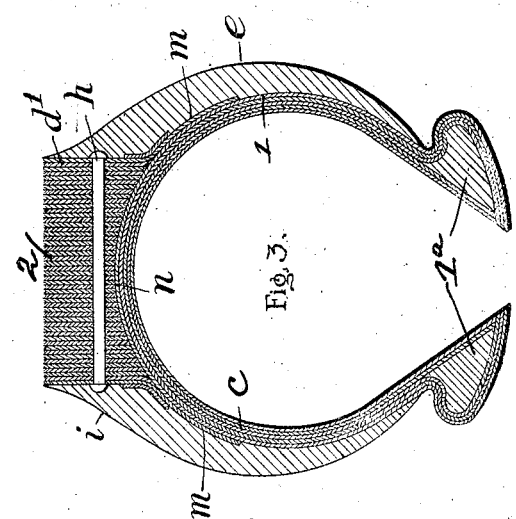
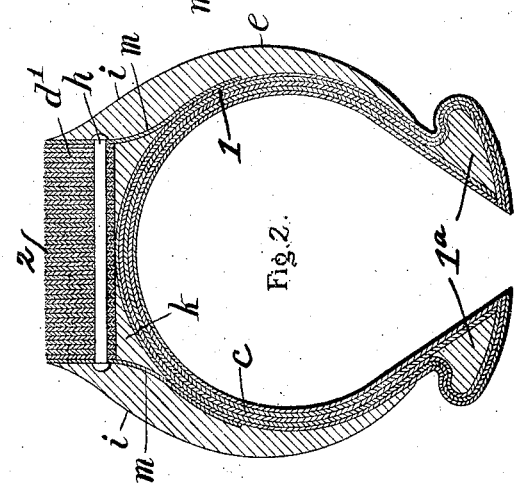
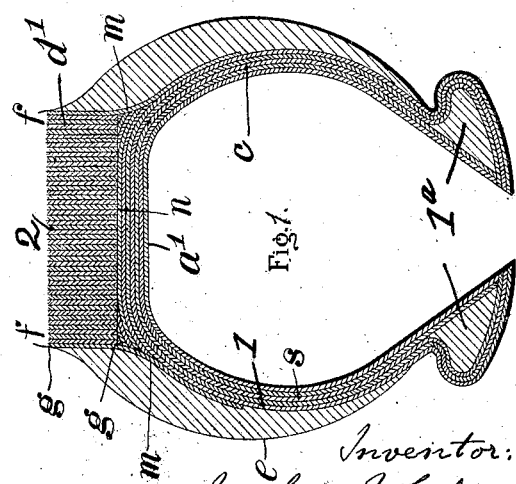

ISAAC SEAMAN McGIEHAN, OF WESTMINSTER, LONDON, ENGLAND.

ELASTIC TIRE FOR VEHICLES.

959,579. Specification of Letters Patent. Patented May 31, 1910.

Application filed January 6, 1908. Serial No. 409,379.

*To all whom it may concern:*

Be it known that I, ISAAC SEAMAN MC-GIEHAN, a citizen of the United States of America, residing at 28 Victoria street, Westminster, London, England, have invented new and useful Improvements in or Relating to Elastic Tires for Vehicles, of which the following is a specification.

This invention relates to pneumatic tires or covers for pneumatic tires, and its object is to produce a tire or cover composed of layers of fabric impregnated with a binder of vulcanized rubber, cement or the like, so as to form an inseparable mass, the tread portion being so formed as to take the load without material deflection, while the sides or walls of the foundation portion receive and absorb the shock. The fabric layers are so arranged as to give additional strength to the rubber and reinforce it in all directions, and prevent the tire from breaking, blistering or becoming granulated, while the rubber unites and binds the fabric in all directions and converts the layers into a substantially homogeneous mass wherein the load is equally distributed.

My invention is illustrated in the accompanying drawings, which form part of this specification in which similar characters represent corresponding parts.

In said drawings—Figure 1 is a transverse sectional view of the preferred form of tire. Figs. 2 and 3 are similar views of slight modifications of the tire.

The tire or cover comprises an inner foundation portion 1 composed of layers of fabric united as hereinafter described, and having on its side edges integral ribs 1ª for engagement with the tire retainers on the wheel felly (not shown). The layers of fabric in the portion 1 are arranged transversely of the tire, when viewed in cross section, as shown in the drawings. In addition, the tire further comprises a tread portion 2, composed of annular layers or rings of fabric set edgewise to the foundation portion 1, and united as hereinafter described, and this tread portion is in practice preferably formed separately from the foundation portion and thereafter inseparably connected therewith as hereinafter explained. The layers of fabric in the tread portion are arranged vertically edgewise, and perpendicular to the layers of fabric in the foundation portion, and longitudinally of the tire—viewed in cross section. The tire in addition to the foregoing further comprises side binders of fabric which assist in firmly uniting the tread portion to the foundation portion as hereinafter explained. The structure of the tire and its essentials will be fully comprehended from the following detailed explanation of the preferred mode of making same.

In constructing the tire I take first, a very fine closely woven mesh fabric to form the inner layer *s* which comes next the mandrel or core of the mold, to prevent the rubber sticking thereto. I then place on this layer *s*, layers *c* of very heavy open mesh fabric previously treated and impregnated with rubber, so that the meshes of the fabric are filled with rubber, but not surfaced with rubber; the layers *c* are placed one upon another to form the foundation portion 1 of the tire, as illustrated.

The tread portion of such foundation 1 is preferably made flat, as at *n* in Fig. 1, and at the edges of the tread portion small fillers of fabric may be applied to extend the flat regular upper or outer surface thereof upon which the vertical fabric tread portion 2 fits.

The tread portion 2 is constructed of a number of layers *d'* of very open mesh fabric treated and impregnated with rubber, so that the meshes are filled, but preferably the surfaces are not coated. Preferably the layers *d'* are cut on the bias, and of a width corresponding to the desired depth or thickness of the tread. The strips *d'* are then laid or wound one upon another within a forming die (not shown) and subjected to hydraulic pressure until the desired thickness of head (*f* to *f*) Fig. 1, is obtained, and then the tread is preferably semivulcanized. The annular tread so formed is then stretched over and onto the tread portion *n* of the foundation portion of the tire as shown in Figs. 1 and 2, thus making a perfect joint between the vertical layers *d'* and transverse layers *c* of fabric, which layers are subsequently all inseparably united when vulcanized. Then binding strips *m*, made of open mesh fabric treated in the same way, are placed in position and rolled on to and against the sides of the foundation portion 1 and tread portion 2. In some cases it may be advisable, as illustrated in Fig. 3, to use several of these binding strips *m*. Then strips of rubber, or suitable covering *e*, are placed in position against the sides of portions 1 and 2 over the binding strips m and then the whole, while mounted on the core, is placed in a proper mold and vulcanized.

As indicated in Fig. 2 the foundation portion 1 is not flattened under the tread portion 2, and the segmental spaces between the inner side of the tread portion and the outer face of the foundation portion are filled by suitable material k which may be fabric or rubber; these fillers being inclosed within the binders m as shown.

As indicated in Figs. 2 and 3 the wear portions may be transfixed by rods h to further bond the layers of the tread portion together.

As indicated in Fig. 3 the tread portion 2 is concaved on its inner face so as to fit closely against the rounded face of the foundation portion 1, the outer layers d' of the tread portion being made wider than the inner layers, so that the fillers k and g may be dispensed with.

The layers of fabric in the foundation and the tread portion being of open mesh and thoroughly impregnated with rubber, preferably without any surface coating, become practically homogeneous when subjected to pressure and vulcanization. As the layers d' in the tread portion stand vertical or perpendicular to the layers c in the foundation portion the rough ends of the open mesh vertical fabric layers d' will become inseparably united with the layers of the foundation portion when the parts are vulcanized; and the tire as a whole when finished is a substantially homogeneous and inseparable mass of rubber and fabric working in unison to receive and distribute the strain and divert it from the tread portion to the walls of the foundation portion. I thus obtain a yielding or moving tread with little or no distinctive transverse deflection therein at the point where it contacts with the road.

The tire or cover thus formed acts in unison and yields as a whole, no individual part being separable from the other, and is able to withstand terrific shocks or strains without injury.

Having described my invention what I claim as new and desire to secure by Letters Patent thereon is:

A tire comprising a foundation portion formed of layers of fabric impregnated with rubber lying transversely of the tread portion, and a tread portion composed of annular layers of fabric impregnated with rubber standing perpendicular to the layers of the foundation portion, and side binders of fabric impregnated with rubber, said foundation portion, side binders, and tread portions and the layers of fabric and rubber therein being permanently united by vulcanization.

In testimony whereof I have signed my name to this specification in the presence of two subscribing witnesses.

ISAAC SEAMAN McGIEHAN.

Witnesses:
    HENRY CONRAD HEIDE,
    H. D. JAMESON.